Inventor
Emery S. Hulstedt
Atty.

United States Patent Office 2,697,618
Patented Dec. 21, 1954

2,697,618

COUPLING PIN LOCKING DEVICE

Emery S. Hulstedt, Belvidere, Ill., assignor of one-half to William Arnold Johnson, Belvidere, Ill.

Application May 21, 1951, Serial No. 227,379

9 Claims. (Cl. 280—515)

This invention relates to an improved coupling pin locking device designed for use in the hitching of wagons and farm implements to tractors for positively preventing accidental uncoupling caused by the coupling pin moving outwardly from its operative position, such movement having been found to occur as a result of relative angular movement between the coupled parts in travelling over rough ground.

The principal object of my invention is to provide a locking device of simple and economical construction and one which, while it is fairly positively lockable in its operative position, can nevertheless be moved rather easily by hand or foot pressure to a retracted position, there being reasonably heavy spring pressure urging an oscillatable locking arm downwardly into engagement with its cooperating locking collar, the collar and locking arm having interengageable saw-toothed portions which prevent accidental oscillation of said arm relative to the collar while nevertheless enabling manual operation of the arm in one direction or the other by application of a sudden thrust laterally.

The locking collar is, according to my invention, locked in a novel manner against rotation relative to the supporting bolt on the draw bar, and the bolt is threaded and receives an adjusting nut, the adjustment of which on the bolt determines the elevation of the locking arm relative to the draw bar to suit any given installation, there being also a lock nut and lock washer on the bolt for engagement with the under side of the draw bar to fasten the locking device securely to the draw bar in its adjusted condition. The construction is furthermore designed to enable easy disassembly and reassembly of the locking device in the event the spring breaks or gets rusted to the point where it has to be replaced.

The invention is illustrated in the accompanying drawing, in which—

Figure 1:
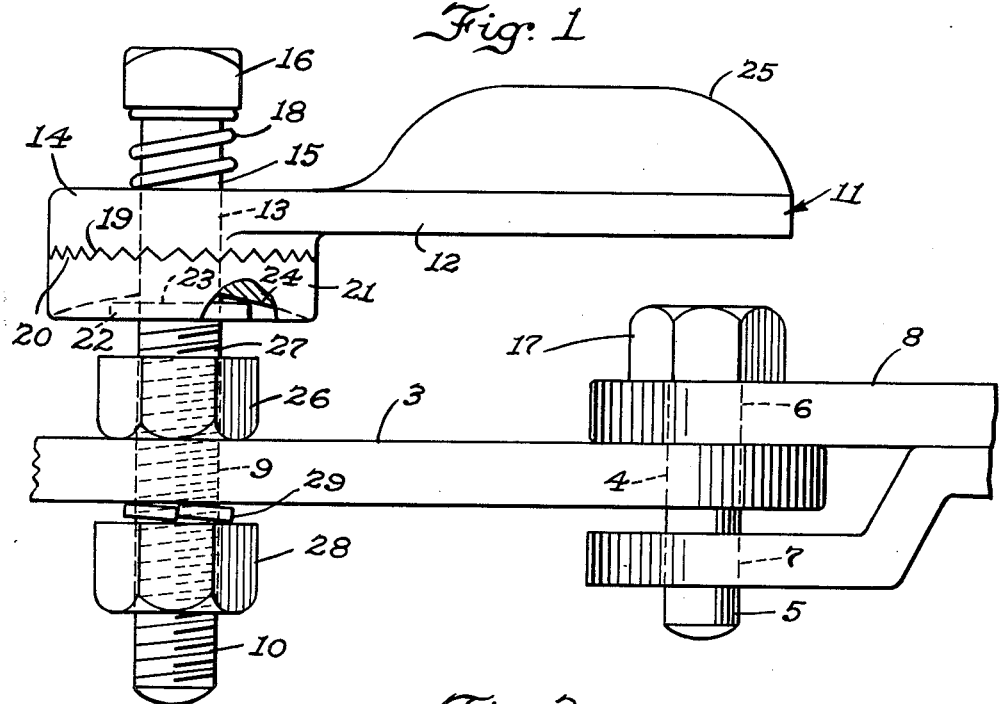
Figure 2:
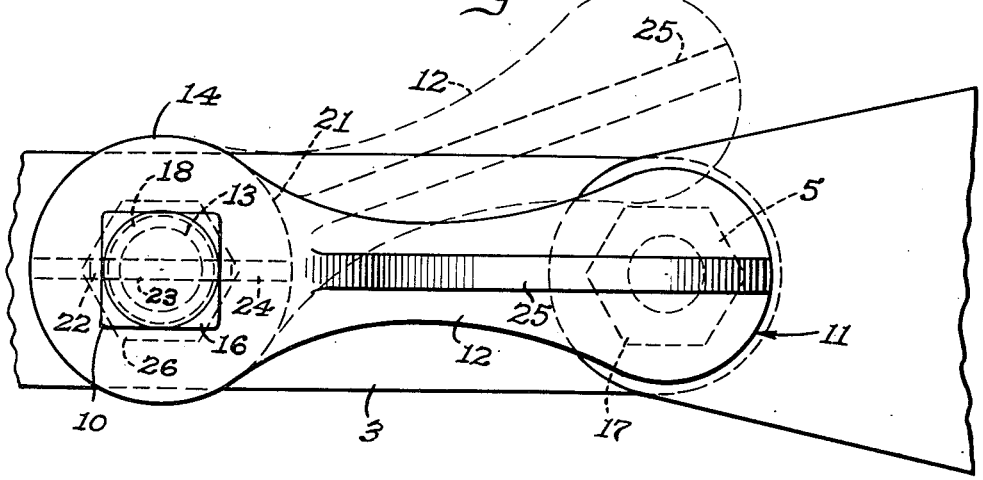

Fig. 1 is a side view of a draw bar showing the clevis on the tongue of a wagon or farm implement hitched thereto by means of a coupling pin and illustrating a locking device for said pin applied to the draw bar and made in accordance with my invention, and Fig. 2 is a top view of Fig. 1, indicating in dotted lines a retracted position of the locking arm.

The same reference numerals are applied to corresponding parts in these two views.

The tractor draw bar is indicated by the reference numeral 3, and 4 is a hole provided in said bar to receive a coupling pin or bolt 5 entered through registering holes 6 and 7 provided in a clevis 8 provided on the end of the tongue of the wagon or implement to be drawn in trailing relation to the tractor. Tractor draw bars usually have another hole 9 in forwardly spaced relation to the hitch hole 4, but if a second hole does not happen to be provided, it may easily be drilled to receive the bolt 10 forming a part of my improved locking device, indicated generally by the reference numeral 11. The locking device is, therefore, applicable usually without any alteration to the majority of tractors and in only a few instances will it be found necessary to provide a second hole to enable application of the locking device to the draw bar.

The device 11 comprises a locking arm 12 which has a hole 13 in its bearing end 14 receiving the smooth shank portion 15 that is provided on the bolt 10 below the head end 16 thereof, whereby the arm 12 is supported for oscillation relative to the bolt in a substantially horizontal plane directly over the head end 17 of the coupling pin 5. A coiled compression spring 18 surrounds the shank 15 and is compressed between the bearing 14 and head end 16 of the bolt so as to keep the saw-tooth projections 19 that are provided on the bottom of the bearing 14 radially thereof interengaged with similar saw-toothed projections 20 that are provided on the top of a locking collar 21 mounted on the shank portion 15 of the bolt under the bearing end 14 of the locking arm 12. The collar 21 may be fixed on the shank of the bolt in any suitable way to prevent endwise movement or rotary movement relative to the shank, but I prefer to provide a cross-pin 22 entered in a hole 23 extending diametrically of the shank, the pin being long enough to project on both sides of the shank and fit in a groove 24 that is milled in the bottom of the collar 21 diametrically thereof in an arc, as clearly appears in Fig. 1, so that there is no likelihood of the pin 22 drifting endwise out of its hole 23 in the bolt, the inclined ends of the groove 24 prohibiting such movement once the collar 21 has been dropped down into locking relationship to the pin. Manifestly, therefore, since the collar 21 is securely locked against turning and the spring 18 urges the arm 12 downwardly toward the collar, keeping the saw-tooth projections 19 and 20 interengaged, the arm 12 is rather positively locked in any position of adjustment, and yet one can, by hand or foot pressure, apply a sudden thrust to the arm from either side to swing it to or from the operative position relative to the coupling pin 5 indicated in full lines in Figs. 1 and 2. A retracted position of the locking arm 12 is indicated in Fig. 2 in dotted lines. An upwardly projecting longitudinally extending rib 25 provided on top of the locking arm 12 on its longitudinal center line affords a good non-slip grip or handle against which the hand or foot pressure may be applied conveniently when moving the locking arm 12 in either direction. By virtue of the novel construction illustrated at 22—24, it is possible to disassemble and reassemble the locking device easily in the event the spring 18 breaks or gets rusted to an extent where it needs replacement.

The elevation of the locking arm 12 in relation to the draw bar 3 can be adjusted to suit the requirements of any installation by virtue of the fact that there is an adjusting nut 26 threading on the threaded lower end portion 27 of the shank of the bolt 10 for abutment on top of the draw bar. A lock nut 28 is also threaded on the bolt 10 below the nut 26 and cooperates with a lock washer 29 so that when this nut is tightened after a desired adjustment of the nut 26, the locking device is fastened securely and rigidly in its adjusted condition.

It is believed the foregoing description conveys a good understanding of the objects and advantages of my invention. The appended claims have been drawn to cover all legitimate modifications and adaptations.

I claim:

1. A locking device of the character described comprising a supporting bolt having a head on one end of its shank, the shank having an elongated smooth cylindrical portion next to the head and being threaded the rest of its length, a coiled compression spring surrounding the bolt next to and abutting the head, an oscillatable locking arm pivoted on said smooth shank portion and engaging the lower end of said spring, the bottom of the pivoted end of said arm having suitable locking projections thereon, a locking collar fitting slidably on said bolt under the pivoted end of said arm and having suitable mating locking projections on the top thereof for releasable locking engagement with the aforesaid projections, said bolt having a hole provided therein extending diametrically therethrough, a collar retaining pin entered in and projecting from opposite ends of said hole for retaining and locking said collar against rotation in a position compressing the spring to a predetermined extent, said collar having a groove provided in the bottom thereof extending diametrically thereof which is wide enough to accommodate the projecting end portions of the pin but shaped so as to prevent endwise removal of said pin from its hole unless the collar is raised off said pin, and adjusting and lock nuts threaded on the end of said bolt in spaced relation to said collar.

2. A device as set forth in claim 1 wherein the groove in the bottom of said collar is struck on an arc of appreciable radius, and the collar retaining pin subtends a middle portion of the arc when disposed in the groove.

3. A device as set forth in claim 1 wherein the locking projections are saw-toothed and the slant of the sides of said teeth is such in relation to the pressure of said spring that the arm is movable laterally manually.

4. Retaining means for a coupling pin, comprising a locking arm having a close pivotal fit at one end on a vertical supporting bolt that is carried on a coupling element, the close pivotal fit permitting the arm to be oscillated in a horizontal plane relative to the bolt and coupling element but prohibiting any appreciable oscillatory movement in a vertical plane, whereby the other free end of said arm, that is disposed over and in spaced retaining relation to the top of the coupling pin, is substantially rigid and positively prevents upward displacement of said pin, the free end of said arm having an upstanding projection of appreciable width shaped for manual operation of said arm from one position to another, spring means urging the pivoted end of the arm downwardly along said vertical bolt to the pin-retaining position, and means semi-positively preventing pivotal movement of said arm relative to said bolt from the pin-retaining position, comprising saw-tooth projections provided radially of the bottom of the pivoted end of said locking arm meshing with saw-tooth projections on a part rigid with the bolt and coupling element and maintained in such meshing engagement under pressure of the aforesaid spring means, said saw-tooth projections having the sides of the teeth so slanted in relation to the pressure of said spring that the free end of the arm is movable laterally manually.

5. Retaining means for a coupling pin, comprising a vertical bolt suitably fixed with freedom for vertical adjustment on a coupling element and having a head on its upper end, a locking arm pivoted at one end on said bolt in downwardly spaced relation to said head for oscillation in a horizontal plane relative to and directly over the pin, said arm being pivoted without freedom for any appreciable oscillatory movement in a vertical plane so that the other end of said arm disposed in retaining relation to the top of the pin positively prevents upward displacement of said pin, a coiled compression spring caged in compressed condition on the bolt between the head thereof and the top of said arm tending to urge the arm bodily downwardly on the bolt, and a locking collar suitably fixed on said bolt below said arm and having saw-tooth projections radially of the top thereof which mesh with saw-tooth projections provided radially of the bottom of the pivoted end of said locking arm, whereby said arm is lockable releasably in either an operative position over said pin or a retracted inoperative position relative thereto, said bolt having a hole provided therein extending diametrically therethrough receiving a collar retaining pin entered in and projecting from opposite ends of said hole, to retain and lock the collar against rotation in a position compressing the spring to a predetermined extent, said collar having a groove provided in the bottom thereof extending diametrically thereof which is wide enough to accommodate the projecting end portions of the pin but shaped so as to prevent endwise removal of said pin from its hole unless the collar is raised off said pin.

6. Retaining means for a coupling pin, comprising a vertical bolt suitably fixed with freedom for vertical adjustment on a coupling element and having a head on its upper end, a locking arm pivoted at one end on said bolt in downwardly spaced relation to said head for oscillation in a horizontal plane relative to and directly over the pin, said arm being pivoted without freedom for any appreciable oscillatory movement in a vertical plane so that the other end of said arm disposed in retaining relation to the top of the pin positively prevents upward displacement of said pin, a coiled compression spring caged in compressed condition on the bolt between the head thereof and the top of said arm tending to urge the arm bodily downwardly on the bolt, and a locking collar suitably fixed on said bolt below said arm and having saw-tooth projections radially of the top thereof which mesh with saw-tooth projections provided radially of the bottom of the pivoted end of said locking arm, whereby said arm is lockable releasably in either an operative position over said pin or a retracted inoperative position relative thereto, said bolt having a hole provided therein extending diametrically therethrough receiving a collar retaining pin entered in and projecting from opposite ends of said hole to retain and lock the collar against rotation in a position compressing the spring to a predetermined extent, said collar having a groove provided in the bottom thereof extending diametrically thereof which is wide enough to accommodate the projecting end portions of the pin but shaped so as to prevent endwise removal of said pin from its hole unless the collar is raised off said pin, the groove in the bottom of said collar being struck on an arc of appreciable radius, and said pin subtending a middle portion of the arc when disposed in the groove.

7. A locking device of the character described comprising a supporting bolt having a head on one end of its shank, the shank having an elongated smooth cylindrical portion next to the head, said bolt being threaded the rest of its length for endwise adjustability with respect to a support, a coiled compression spring surrounding the bolt next to and abutting the head, an oscillatable locking arm pivoted on said smooth shank portion and engaging the lower end of said spring, the bottom of the pivoted end of said arm having suitable locking projections thereon, a locking collar fitting slidably on said bolt under the pivoted end of said arm and having suitable mating locking projections on the top thereof for releasable locking engagement with the aforesaid projections, said bolt having a hole provided therein extending diametrically therethrough, and a collar-retaining pin entered in and projecting from opposite ends of said hole for retaining and locking said collar against rotation in a position compressing the spring to a predetermined extent, said collar having a groove provided in the bottom thereof extending diametrically thereof which is wide enough to accommodate the projecting end portions of the pin but shaped so as to prevent endwise removal of said pin from its hole unless the collar is raised off said pin.

8. A device as set forth in claim 7, wherein the groove in the bottom of said collar is struck on an arc of appreciable radius, and the collar-retaining pin subtends a middle portion of the arc when disposed in the groove.

9. A device as set forth in claim 7, wherein the locking projections are saw-toothed and the slant of the sides of said teeth is such in relation to the pressure of said spring that the arm is movable laterally manually.

References Cited in the file of this patent

UNITED STATES PATENTS

| Number | Name | Date |
|---|---|---|
| 483,221 | Hunt et al. | Sept. 27, 1892 |
| 1,055,867 | Brannon et al. | Mar. 11, 1913 |
| 1,419,398 | Mason | June 13, 1922 |
| 1,790,493 | Taylor | Jan. 27, 1931 |
| 1,968,046 | Linn | July 31, 1934 |
| 2,072,473 | Baumberger | Mar. 2, 1937 |
| 2,392,063 | Reimann et al. | Jan. 1, 1946 |

FOREIGN PATENTS

| Number | Country | Date |
|---|---|---|
| 186,719 | Great Britain | Oct. 6, 1922 |
| 300,750 | Great Britain | Nov. 22, 1928 |